United States Patent
Zhang et al.

(10) Patent No.: US 9,405,982 B2
(45) Date of Patent: Aug. 2, 2016

(54) DRIVER GAZE DETECTION SYSTEM

(71) Applicants: GM GLOBAL TECHNOLOGY OPERATIONS LLC, Detroit, MI (US); CARNEGIE MELLON UNIVERSITY, Pittsburgh, PA (US)

(72) Inventors: Wende Zhang, Troy, MI (US); Dan Levi, Kyriat Ono (IL); Debbie E. Nachtegall, Rochester Hills, MI (US); Fernando De La Torre, Pittsburgh, PA (US); Dong Huang, Pittsburgh, PA (US)

(73) Assignees: GM GLOBAL TECHNOLOGY OPERATIONS LLC, Detroit, MI (US); CARNEGIE MELLON UNIVERSITY, Pittsburgh, PA (US)

(*) Notice: Subject to any disclaimer, the term of this patent is extended or adjusted under 35 U.S.C. 154(b) by 360 days.

(21) Appl. No.: 14/041,016

(22) Filed: Sep. 30, 2013

(65) Prior Publication Data

US 2014/0204193 A1    Jul. 24, 2014

Related U.S. Application Data

(60) Provisional application No. 61/754,134, filed on Jan. 18, 2013.

(51) Int. Cl.
*G06K 9/00* (2006.01)

(52) U.S. Cl.
CPC ........ *G06K 9/00845* (2013.01); *G06K 9/00597* (2013.01); *G06K 9/0061* (2013.01)

(58) Field of Classification Search
CPC ............... G06F 3/013; G06F 3/012; G06T 2207/30201; G06K 9/00845; G08B 21/06
USPC .............................. 348/77, 78, 148
See application file for complete search history.

(56) References Cited

U.S. PATENT DOCUMENTS

| 6,927,694 | B1* | 8/2005 | Smith | B60K 28/066 340/573.1 |
|---|---|---|---|---|
| 2007/0159344 | A1* | 7/2007 | Kisacanin | G06K 9/00362 340/576 |
| 2009/0304232 | A1* | 12/2009 | Tsukizawa | A61B 3/113 382/103 |
| 2010/0033333 | A1* | 2/2010 | Victor | A61B 3/113 340/576 |
| 2011/0007174 | A1* | 1/2011 | Bacivarov | G06K 9/00281 348/222.1 |

* cited by examiner

*Primary Examiner* — Andy Rao
*Assistant Examiner* — Jared Walker

(57) ABSTRACT

A method for detecting an eyes-off-the-road condition based on an estimated gaze direction of a driver of a vehicle includes monitoring facial feature points of the driver within image input data captured by an in-vehicle camera device. A location for each of a plurality of eye features for an eyeball of the driver is detected based on the monitored facial features. A head pose of the driver is estimated based on the monitored facial feature points. The gaze direction of the driver is estimated based on the detected location for each of the plurality of eye features and the estimated head pose.

17 Claims, 6 Drawing Sheets

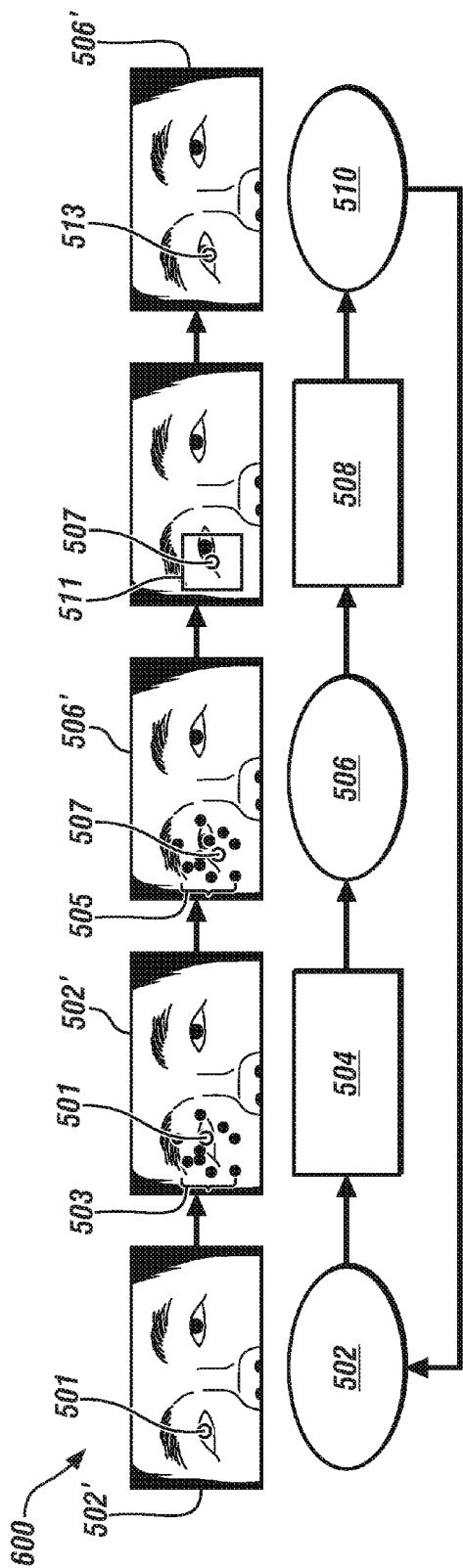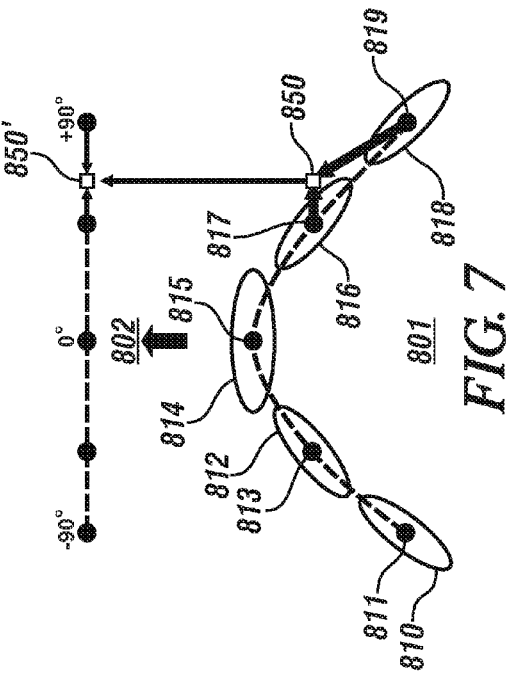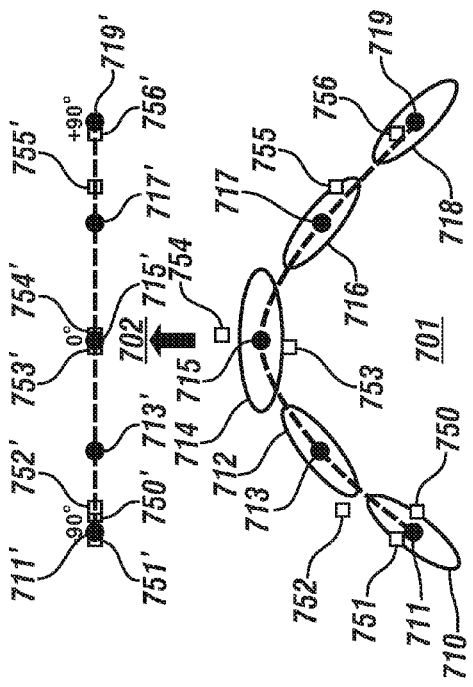

9,405,982 B2

DRIVER GAZE DETECTION SYSTEM

CROSS REFERENCE TO RELATED APPLICATIONS

This application claims the benefit of U.S. Provisional Application No. 61/754,134, filed on Jan. 18, 2013 which is incorporated herein by reference.

TECHNICAL FIELD

This disclosure is related to estimating a gaze direction of a driver in real-time.

BACKGROUND

The statements in this section merely provide background information related to the present disclosure. Accordingly, such statements are not intended to constitute an admission of prior art.

Vehicles having the ability to monitor an operator of a vehicle and detect that the operator is not paying attention to the road scene allow for measures to be taken to prevent a vehicle collision due to the operator not paying attention. For instance, warning systems can be enabled to alert the driver that he or she is not paying attention. Further, automatic braking and automatic steering systems can be enabled to bring the vehicle to a stop if it is determined that the driver has not become attentive even after being warned.

It is known to utilize driver-monitoring camera devices configured to monitor a driver and detect an Eyes-Off-the-Road (EOR) condition indicating that the driver's eyes are not on the road. However, real-time gaze tracking that includes a combination of head pose and eye gaze direction is challenging in the vehicular environment due to (1) different height and facial features of drivers making it difficult to calibrate a camera device for the head pose and gaze direction, (2) unknown illumination conditions leading to unreliable detection of the facial features and (3) abrupt changes in the driver's head pose being difficult to track in video streams contained in image data captured by the camera device.

SUMMARY

A method for detecting an eyes-off-the-road condition based on an estimated gaze direction of a driver of a vehicle includes monitoring facial feature points of the driver within image input data captured by an in-vehicle camera device. A location for each of a plurality of eye features for an eyeball of the driver is detected based on the monitored facial features. A head pose of the driver is estimated based on the monitored facial feature points. The gaze direction of the driver is estimated based on the detected location for each of the plurality of eye features and the estimated head pose.

BRIEF DESCRIPTION OF THE DRAWINGS

One or more embodiments will now be described, by way of example, with reference to the accompanying drawings, in which:

FIG. 5 illustrates an exemplary flowchart used in conjunction with the exemplary flowchart of FIG. 4 for detecting and tracking a location for each of the plurality of eye features of the eyeball, in accordance with the present disclosure;

FIG. 6 illustrates an exemplary embodiment for training subspaces using Supervised Local Subspace Learning executed by block 112 of FIG. 3, in accordance with the present disclosure;

FIG. 7 illustrates an exemplary embodiment of head pose estimation executed by block 112 of FIG. 3 utilizing the trained subspaces of FIG. 6, in accordance with the present disclosure;

FIGS. 9-1 and 9-2 illustrate anatomical constraints of the geometric model of FIG. 8 for estimating the gaze direction of the driver, in accordance with the present disclosure.

DETAILED DESCRIPTION

Figure 1:
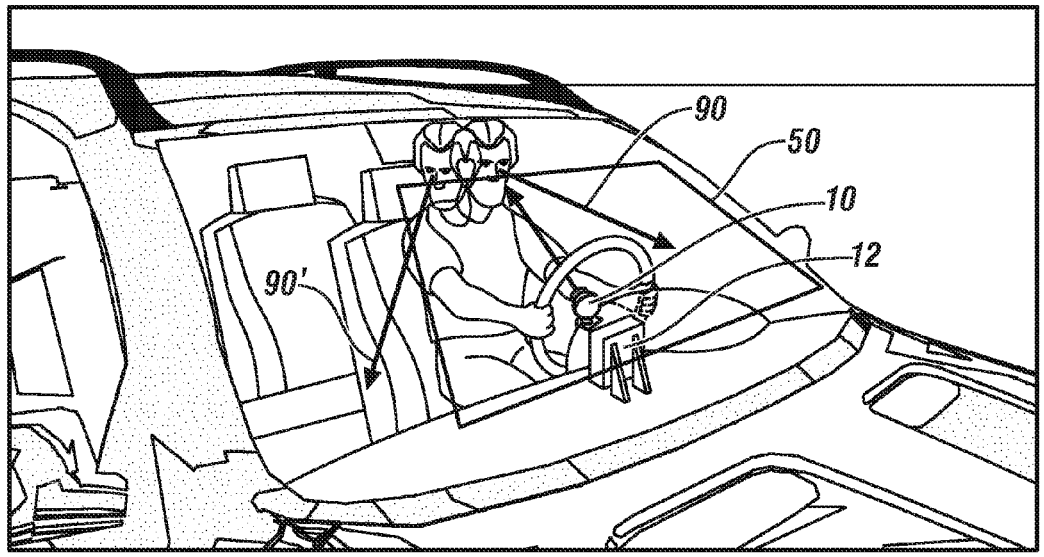
FIG. 1 illustrates an exemplary non-limiting view of a driver and components of a driver gaze tracking system within a vehicle, in accordance with the present disclosure.

Referring now to the drawings, wherein the showings are for the purpose of illustrating certain exemplary embodiments only and not for the purpose of limiting the same, FIG. 1 illustrates an exemplary view of a driver and components of a driver gaze tracking system within a vehicle, in accordance with the present disclosure. The driver gaze tracking system includes an in-vehicle monocular camera device 10 configured to capture image data in a field of view (FOV) directed toward the driver. The captured image data includes video streams that include a plurality of images frames captured in succession. The camera device 10 is capable of receiving light, or other radiation, and converting the light energy to electrical signals in a pixel format using, for example, one of charged couple device (CCD) sensors or complimentary metal-oxide-semiconductor (CMOS) sensors. The camera device 10 is in signal communication with a non-transitory processing device (i.e., processor 20 of FIG. 2) configured to receive the captured image data and output a continuous estimation of gaze direction of the driver in real-time. The processor may be implemented within any suitable compartment of the vehicle such that image input data captured by the camera device 10 can be received. The camera device 10 is mounted within an interior of the vehicle. In one embodiment, the camera device 10 is mounted on a vehicle dashboard above a steering wheel column to alleviate estimations of driver gaze pitch angles such that detections of when a driver is texting can be obtained with greater computational efficiency. The driver gaze tracking system further includes an infrared illuminator 12 configured to project infrared light in a direction toward the driver such that a clear image of the driver's face is obtained by the camera device 10 during low-light conditions such as during night time. Opposed to utilizing a direct light source, infrared light does not impact the vision of the driver. Moreover, captured image data does not suffer from a "bright pupil" produced when near-infrared light sources are utilized. In one embodiment, the camera device does not include an infrared filter that blocks infrared light beyond predetermined wavelengths.

Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any instruction sets including calibrations and look-up tables. The control module has a set of control routines executed to provide the desired functions. Routines are executed, such as by a central processing unit, and are operable to monitor inputs from sensing devices and other networked control modules, and execute control and diagnostic routines to control operation of actuators. Routines may be executed at regular intervals, for example each 3.125, 6.25, 12.5, 25 and 100 milliseconds during ongoing engine and vehicle operation. Alternatively, routines may be executed in response to occurrence of an event.

Embodiments herein are directed toward estimating a gaze direction of the driver in real time based on image input data captured by the camera device 10 and processed by the processor 20. In the illustrated embodiment of FIG. 1, estimated gaze directions 90, 90' are depicted. From each of the gaze directions, a gaze location of the driver can be identified. As used herein, the term "gaze location" describes a point at which the estimated gaze direction intersects a windscreen plane of the vehicle. The gaze locations corresponding to respective ones of the estimated gaze directions 90, 90' can be compared to a road plane 50 within the windscreen plane to determine whether or not an eyes-off-the road condition can be detected. For instance, the gaze location corresponding to the estimated gaze direction 90 is within the road plane 50 indicating the driver's eyes, e.g., gaze direction, are on a road scene in front of the vehicle. In contrast, the gaze location corresponding to the estimated gaze direction 90' is outside of the road plane 50 resulting in detection of the eyes-off-the-road condition. When the eyes-off-the-road condition is detected, an alarm or other measures can be taken to gain the attention of the driver such that the driver retains his/her eyes back upon the road scene.

Figure 2:
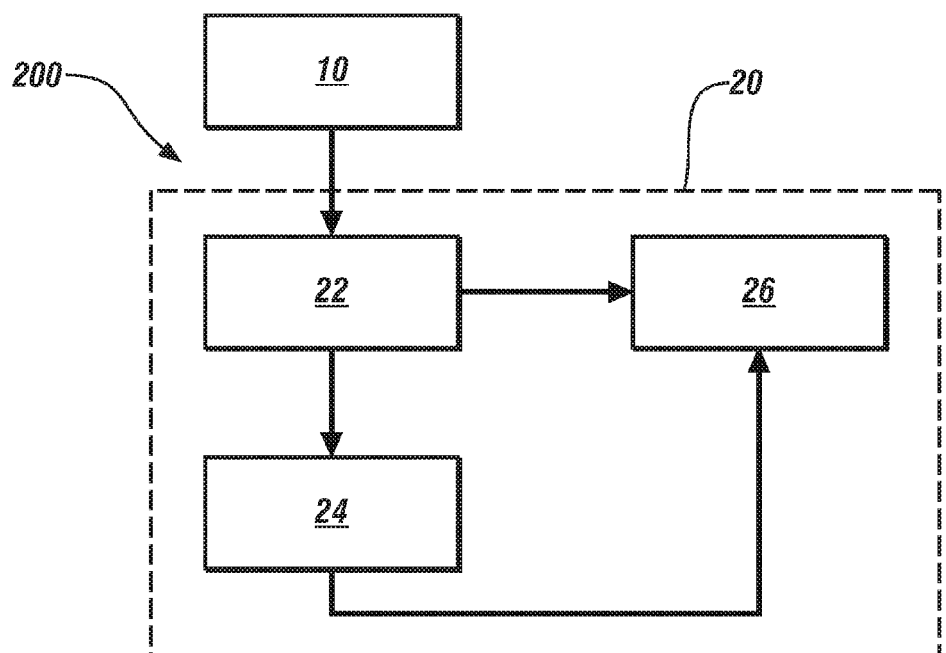
FIG. 2 illustrates a schematic of the driver gaze tracking system of FIG. 1, in accordance with the present disclosure.

FIG. 2 illustrates a schematic of the driver gaze tracking system 200 of FIG. 1, in accordance with the present disclosure. The components of the driver gaze tracking system 200 include the monocular camera device 10 and the processing device 20. The processing device 20 includes a detection and tracking module 22, a head pose estimation module 24 and a gaze direction estimation module 26.

The detection and tracking module 22 monitors facial feature points of the driver within image input data captured by the in-vehicle device. Specifically, the facial feature points are extracted subsequent to detecting a face of the driver. As used herein, the term "facial feature points" can include points surrounding eyes, nose, and mouth regions as well as points outlining contoured portions of the detected face of the driver. Based on the monitored facial feature points, initial locations for each of a plurality of eye features of an eyeball of the driver can be detected. As used herein, the eye features include an iris and first and second eye corners of the eyeball. Accordingly, detecting the location for each of the plurality of eye features includes detecting a location of an iris, detecting a location for the first eye corner and detecting a location for a second eye corner. The first eye corner is indicative of an inner eye corner proximate to a nose bridge and the second eye corner is indicative of an outer eye corner. In one embodiment, the detection and tracking module 22 adjusts face tracking behavior for fair skinned people. Generally, a confidence value for a detected face is low in fair skinned people. A solution is to search intensively, changing a threshold of the tracker in some places of the image.

The head pose estimation module 24 further utilizes the monitored facial features to estimate a head pose of the driver. As used herein, the term "head pose" describes an angle referring to the relative orientation of the driver's head with respect to a camera plane of the camera device. In one embodiment, the head pose includes yaw and pitch angles of the driver's head in relation to the camera plane. In another embodiment, the head pose includes yaw, pitch and roll angles of the driver's head in relation to the camera plane. In one embodiment, the head pose can be tracked from −90 degrees to 90 degrees at 15 Hz.

The gaze direction estimation module 26 estimates the driver's gaze direction (and gaze angle) in a geometric model based on the estimated head pose and the detected locations for each of the iris and first and second eye corners. It will be appreciated that under sudden changes of head pose and illumination, an ability to track facial feature points may be lost temporarily. In this instance, a re-initialization mechanism may be developed to relocate the eye corners and the iris. While the driver gaze tracking system 200 is primary utilized for estimating a gaze direction in real-time, the system can be extended to classify other distractions (e.g., fatigue, drowsiness, chatting on the phone, eating and smoking), to recognize driver emotions, and to recollect other information of the driver (e.g., gender, age, blink rate, temporal gaze direction variation).

In one embodiment, the driver gaze tracking system 200 is calibrated in a fully automatic process which uses information from the driver including height, inner ocular distance, and seat positioning to adjust head pose estimations and gaze direction estimations specific to the driver. This auto-calibration is performed during a first predetermined plurality of image frames subsequent to a key-ON event of the vehicle by the driver. In a non-limiting example, the predetermined plurality of image frames includes 50 image frames and only utilizes detection of a front face of the driver. The inner ocular distance of the driver describes a distance between a center of each eyeball of the driver such that a proportion of the head of the driver is determined. Moreover, the camera device 10 can be calibrated to estimate a distance from the camera device 10 to the driver such that a displacement of a gaze of the driver from the camera device can be calculated. Thereafter, the height of the driver can be determined based on the displacement of gaze. The auto-calibration process further generates a bias to adjust the estimated head pose and the estimated gaze location of the driver based on the determined height and proportion of the head of the driver.

Figure 3:
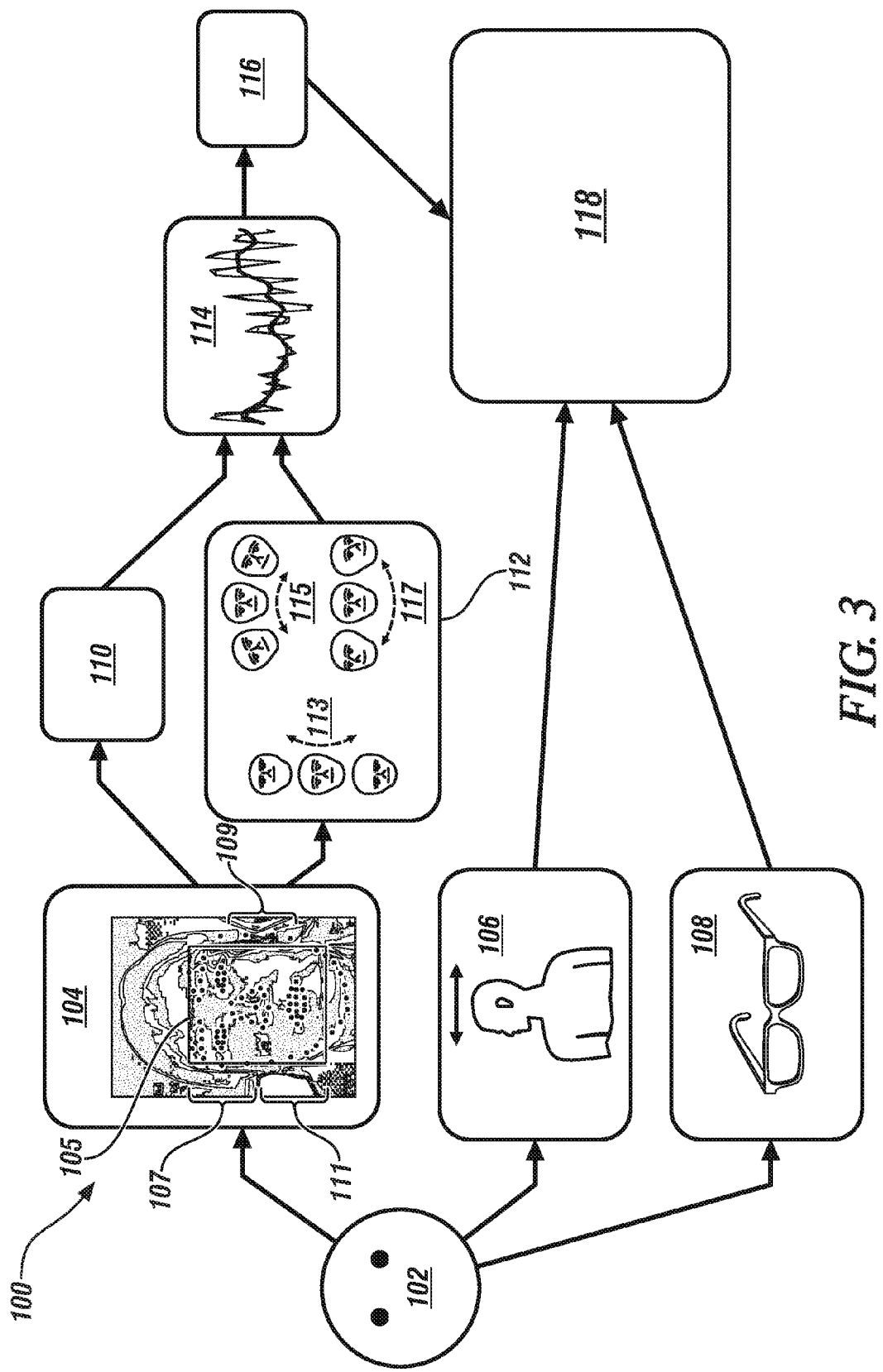
FIG. 3 illustrates an exemplary Eyes-Off-the-Road detection system utilized in conjunction with the driver gaze tracking system of FIGS. 1 and 2, in accordance with the present disclosure.

FIG. 3 illustrates an exemplary Eyes-Off-the-Road (EOTR) detection 100 system utilized in conjunction with the driver gaze tracking system of FIGS. 1 and 2 for detecting the EOTR condition, in accordance with the present disclosure. The EOTR detection system 100 can be executed by the non-transitory processor 20. Referring to block 102, the driver face is detected from input image data captured from the monocular camera device. Face detection is carried out in the detection and tracking module 22. The face of the driver can be detected utilizing an Open Source Computer Vision (Open CV) face detector. The Open CV face detector can include both a frontal face detector and a profile face detector.

At block 104, an image of a detected face is illustrated. Utilizing an Active Appearance Model (AAM) a plurality of facial feature points 107-111 can be detected and extracted from the detected face and then monitored. The facial feature points are extracted by the detection and tracking module. In a non-limiting example, the AAM detects and extracts 66 facial feature points. In one embodiment, the facial feature points are extracted from the detected face for a first image frame. For each consecutive image frame subsequent to the first image frame, a candidate region 105 is identified that encompasses the facial feature points extracted from one or more previous image input frames. The facial feature points can be identified only within the candidate region 105 within each of the consecutive image frames such that processing time is reduced since the face of the driver does not need to be detected in each image frame. In the illustrated embodiment, the plurality of facial feature points include feature points proximate to the driver's eyes 107, facial feature points proximate to the driver's nose and mouth 109, and facial feature points on the contour 111 of the driver's face.

At block 110, a location for each of the plurality of eye features for the eyeball of the driver is detected based on the monitored facial feature points of block 104. Specifically, a location for the iris is detected, a location for the first eye corner is detected and a location for the second eye corner is detected.

Figure 4:
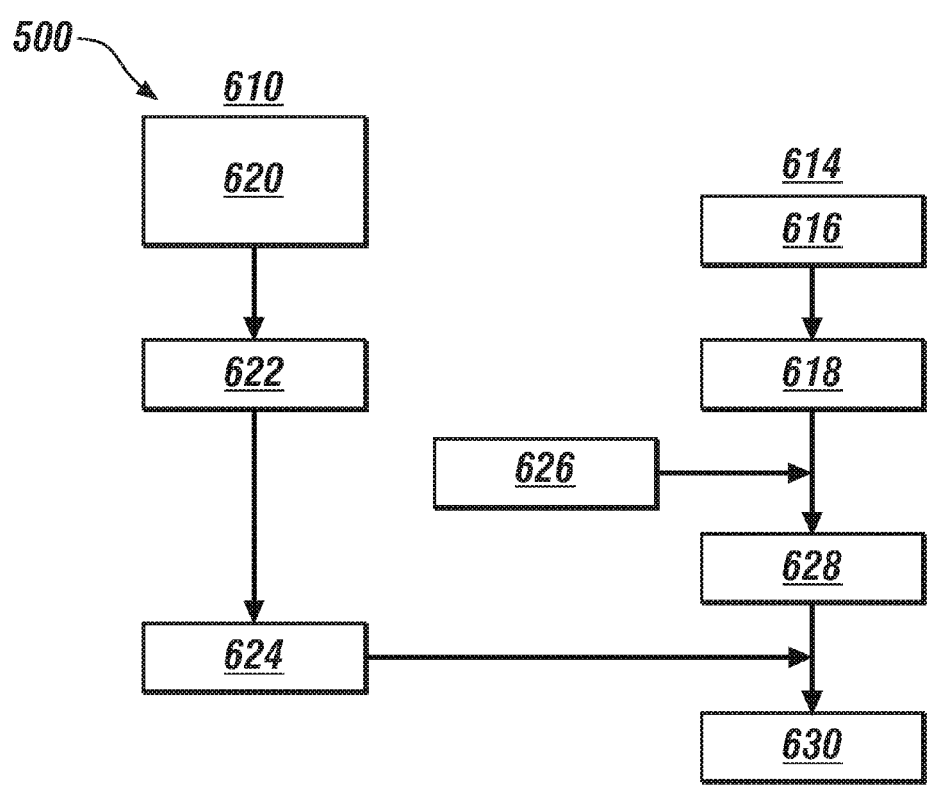
FIG. 4 illustrates an exemplary flowchart for utilizing a support vector machine (SVM) classifier to detect a location for each of a plurality of eye features of an eyeball, in accordance with the present disclosure.

Exemplary embodiments are directed toward facial feature detection and tracking routines executed by the detection and tracking module for detecting the location for each of the plurality of eye elements in consecutive image frames. In general, localizing iris and eye corners is a very delicate task for low resolution cameras. Referring to FIG. 4, an exemplary non-limiting flowchart 500 for utilizing a support vector machine (SVM) classifier to detect a location for each of the plurality of eye features is illustrated, in accordance with the present disclosure. The illustrated embodiment will be described with reference to detecting the location of the iris; however, the flowchart 500 is equally applied for detecting the location of each of the first and second eye corners. The flowchart 500 includes a training state 610 and a testing state 614. During the training state 610, block 620 applies a plurality of image patches around a sampled reference iris obtained from a database. At block 622, a Histogram of Oriented Gradients (HOG) can be obtained from the plurality of image patches based on a distribution of intensity gradients or edge orientations for pixels within each patch. Block 624 monitors positive samples indicated by the HOG indicative of image patches centered at the iris and monitors negative samples indicative of image patches that are not from regions of the iris. Accordingly, one or more of the assigned image patches can be identified by the SVM classifier as being centered around the iris at block 624. During the testing state 614, applying the SVM classifier over an entire image is both inefficient and error prone. Instead, a testing image is monitored at block 616. In one embodiment, the testing image includes an image of the driver's face captured by the monocular camera device 10 of FIG. 1. A confidence map is applied to the test image at block 618. Block 626 selects one or more candidate pixels indicative of the iris location using two statistical priors based on a magnitude of intensity and a detected edge strength. These statistical priors are based on statistics of a plurality of individuals faces observed and stored in a database. At block 628 a confidence score is calculated for each candidate pixel based on a weighted sum of the two statistical priors in accordance with the following relationship.

$$S_{confidence} = \alpha * S_{intensity} + (1-\alpha) * S_{edge} \quad [1]$$

wherein
  $S_{confidence}$ represents the confidence score,
  $\alpha$ represents a confidence variable,
  $S_{intensity}$ represents the magnitude of intensity, and
  $S_{edge}$ represents the edge strength.

Generally, candidate pixels having magnitudes of intensity less than an intensity threshold are indicative of the iris center and candidate pixels having detected edge strengths greater than an edge strength threshold are indicative of the area surrounding the iris center between pupil, sclera, and upper and lower eyelids. Accordingly, increased confidence scores are indicative of pixels having a magnitude of intensity less than the intensity threshold and/or detected edge strengths greater than the edge strength threshold. Block 628 selects top candidate pixel locations each having a respective confidence score that is greater than a confidence score threshold. For each top candidate pixel location, HOG features are extracted within a neighborhood region. Block 630 applies the SVM classifier from block 624 to each of the top candidate pixel locations to generate a classifier response for each of the top candidate pixel locations. The location of the iris is detected from the top candidate location having the highest classifier response.

FIG. 5 illustrates an exemplary flowchart 600 used in conjunction with the exemplary flowchart 500 of FIG. 5 for detecting and tracking a location for each of the plurality of eye features of the eyeball, in accordance with the present disclosure. The illustrated embodiment will be described with reference to detecting the location of the iris; however, the flowchart 600 is equally applied for detecting the location of each of the first and second eye corners. It will be appreciated that solely tracking a single point in image data is vulnerable due to noise, changes in illumination and image warp.

For detecting and tracking the location of the iris in a corresponding image frame, block 502 first identifies the location of the iris 501 detected in an immediately preceding image frame 502'. It will be appreciated that when the corresponding image frame includes a first image frame, the location of the iris detected by block 630 of FIG. 5 will be utilized. Block 504 identifies supplemental feature points 503 surrounding the location of the iris 501 detected in the immediately preceding image frame 502'. The supplemental feature points 503 include a portion of the facial feature points extracted by block 104 of FIG. 3. In a non-limiting embodiment, the supplemental feature points include corner points near the iris center. Exemplary embodiments herein are directed toward block 504 employing a Kanada-Lucas-Tomas (KLT) method to track the supplemental feature points 503 between consecutive frames. It will be appreciated that while each supporting feature point's movement may exhibit discrepancy independently, each supporting feature point agrees on a general direction of the tracked target. Thus, even though some points are inaccurately tracked or lost, the congruity shared by all supporting feature points may cancel the noises presented in the individuals. The KLT method of tracking applied at block 504, expresses each of the feature points S and their displacements $$\{(d_i^x, d_i^y)\}_{i=1}^{|S|}$$

at block 506, wherein the estimating the displacement of the iris center $(d_i^x, d_i^y)$ can be expressed as follows.

$$d_e^x = \frac{1}{|S|} \sum_{t=1}^{|S|} d_i^x, \quad d_e^y = \frac{1}{|S|} \sum_{t=1}^{|S|} d_i^y \qquad [2]$$

The estimated initial location of the iris 507 and the tracked plurality of feature points 505 are illustrated in the corresponding (e.g., current) image frame 506'. The estimated location of the iris is computed as the previous location (e.g., block 502 and immediately previous image frame 502') shifted by $(d_i^r, d_i^r)$. Thus, a location change for each of the supplemental facial feature points is tracked from the immediately preceding image frame 502' to the corresponding image frame 506'. Given the estimated initial location of the iris 507 $(x_i^r, y_i^r)$ in the corresponding image frame 506', block 508 applies a window 511 around the estimated initial location of the iris 507 $(x_i^r, y_i^r)$. Within the area defined by the window 511 illustrated in the corresponding image frame 506', block 508 calculates the confidence score for each of a plurality of pixels disposed therein and surrounding the estimated initial location of the iris 507. It will be appreciated that the confidence score is calculated utilizing Equation [1] as described above with reference to block 628 of FIG. 5. As described with reference to block 628 of FIG. 5, block 508 further selects top candidate pixels within the area defined by window 511, wherein each top candidate pixel has a respective confidence score that is greater than the confidence score threshold. Block 508 further compares the selected top candidate pixels to the trained SVM classifier of block 624 of FIG. 5 to generate the classifier response for each of the top candidate pixels. At block 510, the location of the iris 513 is detected within the corresponding image frame 506' based on the top candidate pixel having the highest classifier response. Often, pixels from hair and eyebrow regions often rank high in the list of classifier responses due to their low magnitudes of intensity. However, statistical priors indicate that hair and eyebrow regions generally have low detected edge responses. In one embodiment, the plurality of pixels within the area defined by window 511 surrounding the estimated initial location of the iris 507 includes only pixels having detected edge responses exceeding a weak edge threshold. In other words, pixels indicate of hair and eyebrow regions are removed from be considered for selection of top candidate pixels.

The flowcharts of FIGS. 4 and 5 will be equally applied for detecting the respective locations for each of the other eye elements, including the first and second eye corners. Other embodiments may be envisioned wherein the location of the mouth is detected in addition to the location for one or more of the plurality of eye elements.

It will be appreciated that existing methods of facial feature detection and tracking generally fall into one of the following categories each having respective drawbacks. For instance, Active Appearance Models (AAMs) are difficult to implement in real time. Additionally, template matching is not reliable under sudden changes in head pose and illumination. Moreover, detection only methods are moderately fast and reliable but can be improved by providing a region of interest (e.g., window 511) to constrain the searching area.

Referring back to FIG. 3, block 112 estimates head pose of the driver within the image input data based on the monitored facial feature points utilizing the head pose estimation module 24 of FIG. 2. It will be understood that the estimated head pose and the locations of the plurality of eye elements are treated separately in the EOTR detection system 100 before being combined for the final gaze direction estimation of block 116. It will be appreciated that the locations for the plurality of eye elements detected in block 110 can be utilized to determine an estimated gaze angle. Head pose estimation is essential to determine the eye gaze viewing direction of the driver, wherein the gaze direction is a combination of head pose and eye gaze angle.

Existing methods for continuous head pose estimation can be grouped into four main categories each having respective drawbacks: appearance template methods, classification-based methods, regression-based methods and embedding-based methods. A drawback associated with appearance template methods is that the templates are usually sensitive to noise, including expression and/or illumination, and typically require uniformly sampled training data to achieve accurate results. One drawback associated with classification based methods is that non-uniform sampling in the training data results only in discrete head pose estimates to be returned. Drawbacks of regression-based methods is that they suffer from irregular distributed training data, prone to over fit in presence of limited training samples, and are not robust to noise in the training or testing images. A drawback of embedding-based methods is that they are unsupervised in nature and do not extract features that incorporate class information.

The existing regression-based methods infer head pose (yaw and pitch angles) directly from image features and is much more robust than the other existing methods. Regression-based methods can include Principal Component Regression (PCR) and Ridge Regression (RR). PCRPCR can remove dimensions that are maximally correlated with the angles and RR typically bias the solution toward small angles. However, the parameters for regression in each of these approaches are computed as averages over training samples, resulting in a poor representation of the angles that are under-sampled. Accordingly, these regression-based methods (linear RR and PCR) tend to produce larger errors in the under-sampled angle regions, whereas k-nearest neighbor (KNN) steadily outperforms regression methods due to the angles (head pose) being estimated as locally weighted combinations of neighboring samples, being less sensitive to the distributed of training set. While KNN may produce better performance than regression-based methods, a major disadvantage of KNN is its computational complexity due to KNN requiring similarity to be computed between the test sample and all training data. KNN is not suitable for the embodiments described herein due to the requirement of real-time implementation for estimating head pose.

Alleviating the drawbacks of the above described existing methods for estimating head pose, block 112 of FIG. 3 executes a Supervised Local Subspace Learning ($SL^2$) that builds local linear models from a sparse and non-uniformly spaced sampled training set. $SL^2$ can be described to learn a mixture of local tangent subspaces that is robust to under-sampled regions and due to its regularization properties, robust to over fitting.

FIG. 6 illustrates an exemplary embodiment for training subspaces using $SL^2$ executed by block 112 of FIG. 3, in accordance with the present disclosure. An output space 702 includes a plurality of uniformly-spaced yaw angles generated within a range of yaw angles from −90 degrees to 90 degrees. Output space 701 includes a plurality of tangent subspaces 710, 712, 714, 716 and 718 each associated with respective ones of the uniformly-spaced pose angles of the output space 702. Each subspace is parameterized by a respective mean denoted by shaded circles 711, 713, 715, 717 and 719 and a respective basis. As used herein, the term "basis" refers to a sub-range of yaw angles within the uniformly-spaced range of yaw angles of the output space 702. In the illustrated embodiment, a plurality of training images denoted by respective squares 750, 751, 752, 754, 755 and 756 each having a different head pose associated with a respective trained yaw angle are sampled in the input space 701. Corresponding squares having like numerals are projected into the output space 702. It will be understood that the training image data of FIG. 6 is small, and therefore, does not uniformly sample the range of yaw angles for estimating head pose based on the monitored facial feature points.

In the illustrated embodiment of FIG. 6, the trained yaw angles corresponding to respective ones of the trained images of different head pose are non-uniformly spaced within the range of yaw angles in the output space 702. Image features X indicative of head pose, i.e., facial feature points, within each trained image are often high dimensional and typically are non-linearly related to the range of yaw angles Θ, in the output space 702. The image features X indicating the respective trained yaw angle in each trained image are modeled with m local subspaces parameterized by the range of angles Θ as follows.

$$X=f(\Theta)\approx f(\langle c_1,G_1,\hat{\theta}_1\rangle,\ldots,\langle c_m,G_m,\hat{\theta}_m\rangle,\Theta) \quad [3]$$

wherein
  $\langle c_i, G_i, \hat{\theta}_i\rangle$ refers to the $i^{th}$ local tangent subspace,
  $c_i$ represents to the mean of each subspace,
  $G_i$ represents the basis of each subspace, and
  $\hat{\theta}_i$ represents a set of uniformly sampled yaw angles.

Utilizing Equation [3] the plurality of tangent subspaces 710, 712, 714, 716 and 718 are generated based on determined angles of the first order Taylor expansion in the mean/center $c_i$ of the $i^{th}$ subspace (there are m local subspaces). Accordingly, each trained image and each associated trained yaw angle can be reconstructed based on the generated plurality of uniformly-spaced yaw angles and the generated plurality of subspaces 710, 712, 714, 716 and 718. Each trained image includes training data points $x_p$, $\theta_p$ that are reconstructed by one of the subspaces, wherein $x_p$ refers to the position in the input space 701 and $\theta_p$ refers to the associated respective yaw angle in the output space 702. The subspace from which $x_p$ will be reconstructed belong to the neighborhood of the angles close to $\theta_p$, mathematically. Subsequently, $x_p$ is expressed as follows.

$$x_p \approx c_i + G_i \Delta\theta_{pi} \quad [4]$$

wherein $\Delta\theta_{pi}$ refers to $\theta_p - \hat{\theta}_i$.

$SL^2$ further minimizes an error function associated with centers of each local subspace $c_iS$ and the basis $G_iS$ as follows.

$$E(c_i,Gi)=\Sigma_{p=1}^n \Sigma_{i\in r_p} w_{pi}^2 \|x_p-(c_i+Gi\Delta\theta_{pi})\|_2^2 + \lambda\Sigma_{j=1}^m \Sigma_{i\in r_j} w_{ji}^2 \|c_j-(c_i+Gi\Delta\theta_{ji})\|_2^2 \quad [5]$$

wherein
  r represents a candidate subspace,
  λ represents a parameter that balances the two terms, and
  $w_{pi}^2$ represents a weighted parameter.

Equation [5] includes a first term of each training sample approximated independently using one of the local subspaces and a second regularization term that enforces that the mean of each subspace is to be reconstructed by the neighboring subspaces. The first term describes that the local subspaces are selected by the angles that are close to the associated respective yaw angle $\theta_p$, while the second term ensures that the subspace parameters vary smoothly and can be estimated from sparse non-uniform image data. The weighted parameter $w_{pi}^2$ weights the contribution of each neighboring subspace to the data sample reconstruction, and is expressed as follows.

$$w_{pi}^2 = \frac{\psi(\theta p, \hat{\theta}_i)}{\sum_{q=1}^{\|r_p\|} \psi(\theta p, \hat{\theta}_i)} \quad [6]$$

wherein $\psi(\theta p, \hat{\theta}_i)$ represents any positive valued function inversely proportional to the distance between trained and uniformly sampled yaw angles.

Utilizing Equation [6], block 112 can solve Equation [5] efficiently by an alternated least square method.

FIG. 7 illustrates an exemplary embodiment of head pose estimation executed by block 112 of FIG. 3 utilizing the trained subspaces of FIG. 6, in accordance with the present disclosure. Like numerals in FIG. 7 refer to like features in FIG. 6. FIG. 7 illustrates the input space 801 and output space 802. Within the input space 801, block 112 identifies two candidate subspaces 816 and 818 among the plurality of subspaces 810, 812, 814, 816 and 818 based on a new test data point $x_t$ 850 illustrated in the input space 801. Specifically, the new test data point $x_t$ 850 is indicative of one or more of the monitored facial feature points within a corresponding image frame captured by the camera device 10 of FIG. 1. The two candidate subspaces 816 and 818 are neighboring subspaces to the new test data point $x_t$ 850, and are found in two steps for efficiency purposes, including: (1) locating the two candidate subspaces (e.g., 816 and 818) whose centers/means (e.g., 817 and 819) are closest to $x_t$ 850 in the input space 801; and (2) selecting the neighboring subspace from the two candidates having a lowest reconstruction error of the new test data point $x_t$ 850. The lowest reconstruction error is computed using equations [5] and [6], wherein the weight of $w_{ti}^2$ of each of the candidate subspaces 814 and 816 contributing to $x_t$ 850 is determined and $\hat{\theta}_i$ is the yaw angle associated with the center of the $i^{th}$ subspace. In the illustrated embodiment the $i^{th}$ subspace corresponds to neighboring subspace 816. An optimal yaw angle $\theta_t$ of the corresponding image may then be computed by minimizing the reconstruction error for $x_t$ 850 rearranging Equation [5] as follows.

$$\theta_t = (\Sigma_{i\in r_t} w_{ti}^2 G_i^T G_i)^{-1} \Sigma_{i\in r_t} w_{ti}^2 G_i^T (x_t - c_i + G_i \hat{\theta}_i) \quad [7]$$

It will be appreciated that the optimal yaw angle $\theta_t$ corresponds to the estimated head pose based on the uniformly-spaced yaw angle of the input output space 802 associated with the selected neighboring subspace 816 within the input space 801. The methodology provided by $SL^2$ provides reduced expenses related to computations because only the optimal yaw angle $\theta_t$ needs to be computed, whereas the aforementioned existing methods described above need to store all training points, and compute similarities between a test data point and the training set. For instance, Equation [7] has a computational complexity of O(md+3dk), wherein k is the number of neighboring subspaces, m is the number of subspaces and d is the dimension of HOG features. Existing methodologies, such as KNN, has a computation complexity of about O(3n+nd), wherein n is the number of training samples, and typically n is far greater than m and k of $SL^2$.

In some embodiments, the estimated head pose of block 112 may further include estimating a yaw angle using a detection region given by the profile face detector and using the estimated yaw angle to correct the detected face location using a relation learned in training to finally estimate the head pose using a rectified face location. Prior to extracting and monitoring the facial feature points of the driver in block 104, the detection region can be provided within the image input data to encompass a face location of the driver detected by the profile face detector in block 102 of FIG. 3. Using stored data of known face centers with respect to yaw angle, the yaw angle of the detected face location of the driver may be estimated within the detection region to generate a rectified face location. This rectified face location can be utilized to estimate the head pose of the driver as described with respect to Equations [3]-[7] of block 112.

Referring to block 114 of the EOTR detection system 100 of FIG. 3, the head pose estimated in block 112 and the locations of each of the iris and first and second eye corners detected and tracked in block 110 are filtered and smoothed using any known method desired. Subsequently, block 116 estimates the driver gaze direction. Similarly, the driver gaze angle is estimated by block 116.

Figure 8:
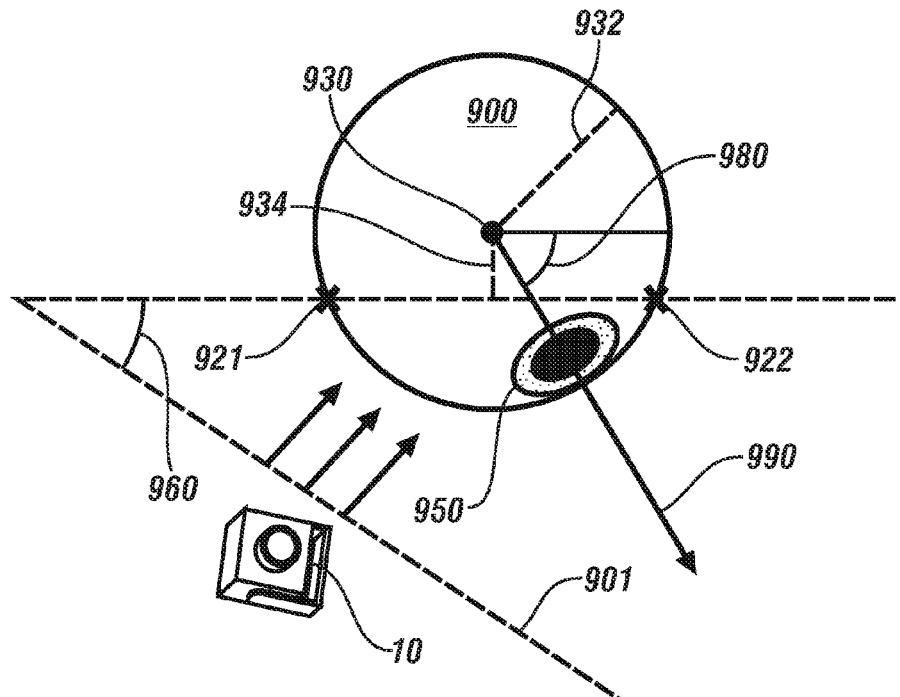
FIG. 8 illustrates a geometric model of the driver gaze tracking system 200 of FIG. 2 with respect to detected and tracked locations for each of the plurality of eye features executed by block 110 of FIG. 3 and the head pose estimation executed by block 112 of FIG. 3, in accordance with the present disclosure.

FIG. 8 illustrates a geometric model of the driver gaze tracking system 200 of FIG. 2 with respect to detected and tracked locations for each of the plurality of eye features executed by block 110 of FIG. 3 and the head pose estimation executed by block 112 of FIG. 3, in accordance with the present disclosure. The geometric model of FIG. 8 assumes that eyeball 900 is spherical and that the location of eye corners 921 and 922 have been accurately estimated. The geometric model includes the eyeball 900, a face plane, a camera plane 901 and the camera device 10 of FIG. 1. The detected and tracked location of the first eye corner 922 and the second eye corner 921 are illustrated along the face plane. The detected and tracked location of the iris 950 is illustrated below the face plane. The estimated head pose angle is represented by angle 960 with respect to the face plane and the camera plane 901. Point 930 represents a projection point from a center of the eye ball to the face plane 902 and dashed line 932 represents a radius of the eyeball, both of which are estimated through computations expressed in Equations [8]-[10] below. Dashed vertical line 934 represents a projection distance between the center of the eyeball 930 and the face plane. Based on obtained anatomical constraint coefficients with respect to the estimated head pose angle 960, a gaze angle 980 and corresponding gaze direction 990 can be estimated by block 116 through computations expressed in Equations [11]-[13] below based on the detected and tracked locations of the iris 950, the first eye corner 922, the second eye corner 921, the center 930 of the eyeball 900 and the radius 932 of the eyeball 900.

Figures 1, 9:
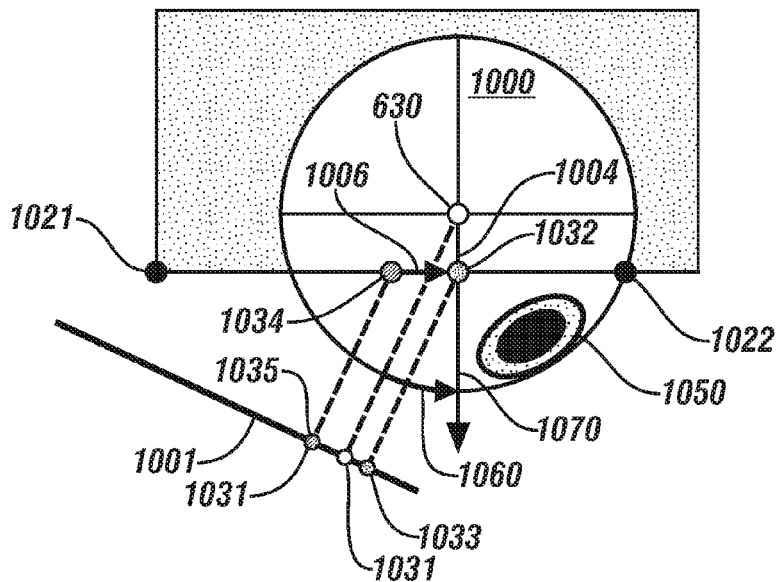
Figures 2, 9:
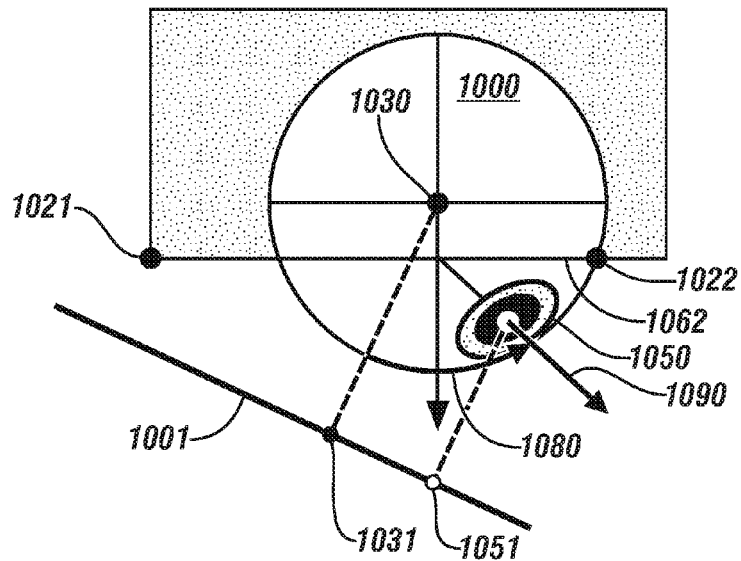

FIGS. 9-1 and 9-2 illustrate anatomical constraints of the geometric model of FIG. 8 for estimating the gaze direction of the driver, in accordance with the present disclosure. Like numerals of FIGS. 9-1 and 9-2 refer to like features in the geometrical model of FIG. 8. FIG. 9-1 illustrates a top down view of the eyeball 1000 for computing offsets to the center 1030 of the eyeball using the estimated head pose 1060. FIG. 9-2 illustrates the top down of the eyeball 1000 for estimating the gaze direction 1090 and the gaze angle 1080. Point 1034 represents a midpoint "m" of the eye corners 1022 and 1021 to point 1032, which is the projection point of the eyeball center 1030 onto the face plane. Line 1004 represents a scaled projection distance between the center of the eyeball 930 and the face plane. Line 1006 represents deviation, T, from the midpoint m 1034 to point 1032. It will be appreciated that FIGS. 9-1 and 9-2 depict a two dimensional image of a top down view of the eyeball. Image plane 1001 is further illustrated including projection point 1035 from the midpoint m 1034, projection point 1031 from the center 1030, and projection point 1033 from point n 1032 projected thereon. The head pose, or direction of head pose 1070, is illustrated with respect to the head pose angle 1060 in FIG. 9-1. FIG. 9-2 further illustrates projection point 1051 upon the image plane 1001 from the iris 1050.

The midpoint m 1034 between the eye corners 1021 and 1022 is expressed as follows.

$$\begin{pmatrix} m_x \\ m_y \end{pmatrix} = \begin{pmatrix} \frac{e1_x + e2_x}{2} \\ \frac{e1_y + e2_y}{2} \end{pmatrix} \quad [8]$$

wherein
e1 is the first eye corner 1022, and
e2 is the second eye corner 1021.

A scale of the face of the driver must be calculated by a distance between the eye corners 1021 and 1022 based on the head pose angle $\Phi$ 1060. It will be appreciated that a minimum value of S is reached in a full-frontal face wherein the head pose angle $\Phi$ is equal to zero. It will be further appreciated that projection distance between eye corners within the corresponding image decrease as head rotation increases. The scale, S, of the face is expressed as follows.

$$S = \frac{\sqrt{(e1_x - e2_x)^2 + (e1_y - e2_y)^2}}{\cos\Phi_x} \quad [9]$$

The center of the eyeball 1030, O, is calculated using the midpoint m calculated in Equation [8] based on the head pose angle ($\Phi_x$, $\Phi_y$) as follows.

$$\begin{pmatrix} O_x \\ O_y \end{pmatrix} = \begin{pmatrix} m_x \\ m_y \end{pmatrix} + S\begin{pmatrix} T_x\cos\Phi_x \\ T_y\cos\Phi_y \end{pmatrix} + SL\begin{pmatrix} \cos\Phi_x \\ \sin\Phi_x \end{pmatrix} \quad [10]$$

wherein
$T_x$ and $T_y$ represent a deviation from the midpoint m 1034 to point 1032, and
SL represents the scaled projection distance 1004 between the center of the eyeball 930 and the face plane.

The radius of the eyeball R 932 is obtained by multiplying a normalized radius $R_0$ with the scale of the face, S, calculated in Equation [9].

Based on the obtained anatomical constraints determined in Equations [8]-[10] above, the estimated gaze direction 1090 is expressed as follows.

$$\begin{pmatrix} \sin\theta_x \\ \sin\theta_y \end{pmatrix} = \frac{\frac{p_x - o_x}{\sqrt{R^2 - (p_y - o_y)^2}}}{\frac{p_y - o_y}{\sqrt{R^2 - (p_x - o_{yx})^2}}} \quad [11]$$

wherein $\theta_x$ and $\theta_y$ represent the gaze angle 1080.

It will be appreciated that the gaze angles $\theta_x$ and $\theta_y$ indicate a yaw angle and a pitch angle, respectively, with respect to the image plane. The gaze direction is determined based upon both the yaw and pitch angles. In Equations [10] and [11], the head pose angle and eye gaze angle in world coordinates depends on the anatomical constraints $R_0$, L, $T_x$, and $T_y$. In one embodiment, the anatomical constraints $R_0$, L, $T_x$, and $T_y$ are computed off-line given eye gaze angles $\theta_x$ and $\theta_y$. Accordingly, the anatomical constraints $R_0$, L, $T_x$, and $T_y$ are expressed as follows.

$$\begin{pmatrix} \sin\theta_x \\ \sin\theta_y \end{pmatrix} = \begin{pmatrix} \dfrac{p_x - m_x - ST_x\cos\emptyset_x - SL\sin\emptyset_x}{\sqrt{(SR_0)^2 - (p_y - o_y)^2}} \\ \dfrac{p_{xy} - m_y - ST_y\cos\emptyset_y - SL\sin\emptyset_y}{\sqrt{(SR_0)^2 - (p_x - o_x)^2}} \end{pmatrix} \quad [12]$$

Exemplary embodiments collect a set of training samples with lab calibrated gaze angle ($\theta_x$, $\theta_y$) and head pose angle ($\emptyset_x$, $\emptyset_y$). Each training sample may take the form of either ($\theta_x$, $\theta_y$, $\emptyset_x$, $\emptyset_y$)=($\alpha_x^i$, 0, $\beta_x^i$, 0) or ($\theta_x$, $\theta_y$, $\emptyset_x$, $\emptyset_y$)=(0, $\alpha_y^i$, 0, $\beta_y^i$). Using $N_x$ images of the first form and $N_y$ images of the second form, the anatomical constraints $R_0$, L, $T_x$, and $T_y$ can be expressed as follows.

$$\begin{pmatrix} \dfrac{p_x^1 - m_x^1}{S_1} \\ \dfrac{p_x^2 - m_x^2}{S_2} \\ \vdots \\ \dfrac{P_x^{N_x} - m_x^{N_x}}{S_{N_y}} \\ \dfrac{p_y^1 - m_y^1}{S_1} \\ \dfrac{p_y^2 - m_y^2}{S_2} \\ \vdots \\ \dfrac{P_y^{N_y} - m_y^{N_y}}{S_{N_y}} \end{pmatrix} = \begin{pmatrix} \sin\alpha_x^1 & \sin\beta_x^1 & \cos\beta_x^1 & 0 \\ \sin\alpha_x^2 & \sin\beta_x^2 & \cos\beta_x^2 & 0 \\ \vdots & \vdots & \vdots & \vdots \\ \sin\alpha_x^{N_x} & \sin\beta_x^{N_x} & \cos\beta_x^{N_x} & 0 \\ \sin\alpha_y^1 & \sin\beta_y^1 & 0 & \cos\beta_y^1 \\ \sin\alpha_y^2 & \sin\beta_y^2 & 0 & \cos\beta_y^2 \\ \vdots & \vdots & \vdots & \vdots \\ \sin\alpha_y^{N_y} & \sin\beta_y^{N_y} & 0 & \cos\beta_y^{N_y} \end{pmatrix} \begin{pmatrix} R_0 \\ L \\ T_x \\ T_y \end{pmatrix} \quad [13]$$

The least squares solution of Equation [13] yields the anatomical constraint coefficients $R_0$, L, $T_x$, and $T_y$.

Referring to block 118 of the EOTR detection system 300 of FIG. 3, a determination is made on whether or not the EOTR condition exists based on the estimated gaze direction determined by Equation [11] in block 116, a mean shift for detecting that the driver's face is present over 45 degrees of yaw of block 106, and whether or not a detection has been made that the driver is wearing sunglasses of block 118. It will be appreciated that other methods for estimating driver gaze direction can be implemented if, in fact, block 108 determines the driver is wearing eyeglasses or sunglasses.

Described above with reference to the exemplary non-limiting view of the driver of FIG. 1, a gaze location can be identified based on the estimated gaze direction, wherein the gaze location describes a point at which the estimated gaze direction intersects a windscreen plane of the vehicle. Illustrated with respect to FIG. 1, a predetermined road plane 50 can be overlaid within the windscreen plane. If the gaze location of the driver is outside the road plane, the EOTR condition exists and appropriate measures can be taken to regain the attention of the driver.

Figure 10:
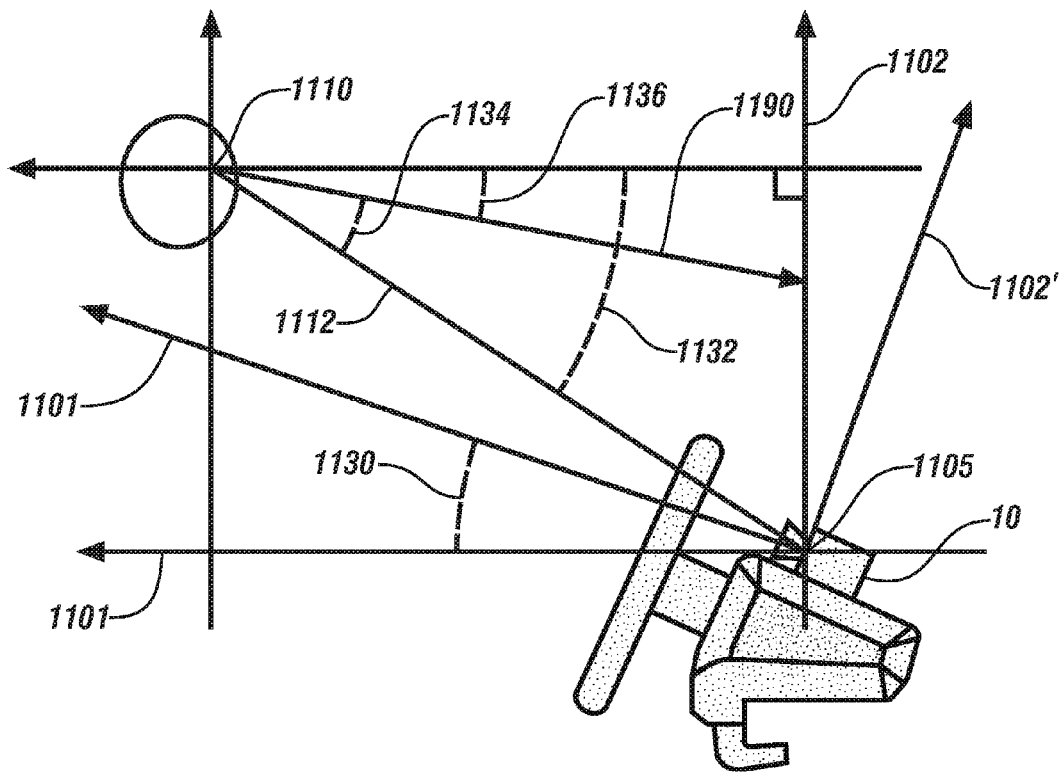
FIG. 10 illustrates a geometric model for determining an angle of pitch describing a height of a head of the driver with respect to the monocular camera device of FIG. 1, in accordance with the present disclosure.

FIG. 10 illustrates a geometric model for determining an angle of pitch describing a height of a head of a driver with respect to the monocular camera device 10 of FIG. 1, in accordance with the present disclosure. The geometric model includes an eye position 1110 and the monocular camera device 10 of FIG. 1 mounted on top of a steering wheel column. A world coordinate system is illustrated including a z-axis 1101 and a y-axis 1102. It is appreciated that the camera device 10 is tilted with respect to the world coordinate system such that image data of the driver's face can be captured. The camera's tilt is expressed as angle 1130. Accordingly, a camera coordinate system, including a z'-axis 1101' and a y'-axis 1102', is illustrated based on rotating the world coordinate system by the camera's tilt angle 1130. Line 1112 represents a projection from the driver's head with respect to the camera coordinate system and line 1190 represents the gaze direction of the driver. Pitch angle 1134 depends on the height of the driver's head with respect to the camera device 10, while angle 1136 is invariant thereto. Thus, estimation of gaze invariant to the driver's head position requires a computation of pitch angle 1136. Angle 1136 is computed based on subtracting pitch angle 1135 from pitch angle 1132. A gaze yaw angle can similarly be estimated for the other dimension of the world coordinate system by projecting an x-axis that is perpendicular with respect to the y- and z-axis and the camera coordinate system by projecting an x-axis perpendicular to the y'- and z'-axis. Using the pitch angle 1134 and the similarly determined yaw angle for the other dimension associated with the gaze yaw angle, a 3-dimensional vector of the driver's gaze direction can be expressed as follows.

$$\overline{U}_{gaze} = \begin{bmatrix} \cos(\emptyset_{pitch}) \cdot \sin(\emptyset_{yaw}) \\ \sin(\emptyset_{pitch}) \\ -\cos(\emptyset_{pitch}) \cdot \cos(\emptyset_{yaw}) \end{bmatrix} \quad [14]$$

wherein
$\emptyset_{pitch}$ represents the pitch angle 1136,
$\emptyset_{yaw}$ represents the yaw angle corresponding to the other dimension associated with yaw angle.

Utilizing the 3-dimensional gaze vector $\overline{U}_{gaze}$, the three-dimensional gaze direction denoted by line 1190 can be estimated using a parametric three-dimensional line. The three-dimensional driver gaze location describing the point at which the estimated gaze direction intersects a windscreen plane of the vehicle.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:
1. Method for detecting an eyes-off-the-road condition based on an estimated gaze direction of a driver of a vehicle, comprising:
monitoring facial feature points of the driver within image input data captured by an in-vehicle camera device;
detecting a location for each of a plurality of eye features for an eyeball of the driver based on the monitored facial feature points, comprising:
  detecting a location of an iris;
  detecting a location for a first eye corner indicative of an inner eye corner proximate to a nose bridge;
  detecting a location for a second eye corner indicative of an outer eye corner;

for each corresponding eye feature of the plurality of eye features, training a classifier, comprising:
assigning image patches around a reference eye feature respective to the corresponding eye feature obtained from a database; and
identifying one or more of the assigned image patches that are centered around the reference eye feature;
estimating a head pose of the driver based on the monitored facial feature points; and
estimating the gaze direction of the driver based on the detected location information for each of the plurality of eye features and the estimated head pose.

2. The method of claim 1, wherein the monitored facial feature points are extracted in accordance with the steps, comprising:
for a first image frame, detecting a face of the driver and extracting the facial feature points from the detected face;
for each consecutive image frame subsequent to the first image frame:
identifying a candidate region encompassing the facial feature points extracted from one or more previous image input frames; and
identifying the facial feature points only within the candidate region.

3. The method of claim 1, further comprising:
for each corresponding eye feature within a first image frame:
selecting candidate pixels indicative of the corresponding eye feature using two statistical priors based on a magnitude of intensity and a detected edge strength;
calculating a confidence score for each candidate pixel based on a weighted sum of the two statistical priors;
selecting top candidate pixels each having a respective confidence score that is greater than a confidence score threshold;
comparing each of the top candidate pixels to the trained classifier to generate a classifier response respective to each of the top candidate pixels; and
detecting the location of the corresponding eye feature within the first image frame based on the generated classifier responses of the top candidate pixels.

4. The method of claim 3, further comprising:
for each corresponding eye feature within each consecutive image frame subsequent to the first image frame:
identifying supplemental facial feature points surrounding the corresponding eye feature detected in an immediately preceding image frame;
tracking a location change for each of the supplemental facial feature points from the immediately preceding image frame to the corresponding image frame;
estimating an initial location of the corresponding eye feature in the corresponding image frame based on the tracked location change of the supporting feature points;
calculating the confidence score for each of a plurality of pixels within an area surrounding the estimated initial location of the corresponding eye feature;
selecting top candidate pixels within the area surrounding the estimated initial location, wherein each top candidate pixel has a respective confidence score that is greater than the confidence score threshold;
comparing the top candidate pixels to the trained classifier to generate the classifier response for each of the top candidate pixels; and
detecting the location of the corresponding eye feature within the corresponding image frame based on the top candidate pixel having the highest classifier response.

5. The method of claim 4, wherein the plurality of pixels within the area surrounding the estimated initial location of the corresponding eye feature includes only pixels having detected edge responses exceeding a weak edge threshold.

6. The method of claim 1, wherein estimating the head pose of the driver based on the monitored facial feature points, comprises:
in an output space, generating a plurality of uniformly-spaced yaw angles within a range of yaw angles;
in an input space:
generating a plurality of subspaces each associated with respective ones of the uniformly-spaced yaw angles and parameterized by a respective mean and basis,
identifying two candidate subspaces among the plurality of subspaces closest to the monitored facial feature points, and
selecting a neighboring subspace among the two candidate subspaces having a lowest reconstruction error associated with the monitored facial feature points; and
estimating the head pose of the driver based on the uniformly-spaced yaw angle in the output space associated with the selected neighboring sub-space in the input space.

7. The method of claim 6, wherein estimating the head pose of the driver further comprises:
sampling a plurality of training images in the input space each associated a respective trained yaw angle, wherein the trained yaw angles are non-uniformly-spaced within the range of angles in the output space;
reconstructing each trained image and each associated trained yaw angle based on the generated plurality of uniformly-spaced yaw angles and the generated plurality of subspaces; and
estimating the head pose of the driver based on one of the reconstructed training images and the trained yaw angle associated therewith.

8. The method of claim 1, further comprising:
prior to the monitoring facial feature points of the driver:
providing a detection region within the image input data encompassing a face location of the driver detected by a profile face detector;
using stored data of known face centers with respect to yaw angle, estimating a yaw angle of the detected face location of the driver within the detection region to generate a rectified face location; and
estimating the head pose of the driver within the image input data using the rectified face location.

9. The method of claim 1, wherein estimating the gaze direction of the driver based on the detected location information for each of the plurality of eye features and the estimated head pose, comprises:
detecting a location for each of first and second eye corners of the eyeball;
calculating a midpoint between the detected location for each of the first and second eye corners of the eyeball;
calculating a center of the eye ball using the calculated midpoint and two corrections based on the estimated head pose;
calculating a scale of the face of the driver based on a distance between the detected first and second eye corners and the estimated head pose;

calculating a radius of the eye ball based on multiplying a normalized radius of the eye ball with the calculated scale of the face; and estimating the gaze direction of the driver based on the calculated radius of the eye ball and the calculated center of the eye ball.

10. The method of claim 1, further comprising:

identifying a gaze location of the driver corresponding to a point at which the estimated gaze direction intersects a windscreen plane of the vehicle;

comparing the identified gaze location of the driver to a road plane within the windscreen plane; and detecting the eyes-off-the-road condition only when the identified gaze location is outside the road plane.

11. The method of claim 1, wherein the in-vehicle camera device comprises a monocular camera device mounted proximate to a steering wheel on an interior of the vehicle, the monocular camera device configured to capture a field of view directed toward the driver.

12. The method of claim 1, further comprising:

illuminating an interior of the vehicle using an infrared illuminator during low-light conditions within the interior of the vehicle.

13. The method of claim 1, further comprising:

prior to monitoring the facial feature points of the driver, performing an auto-calibration during a predetermined number of image frames such that the estimated head pose and the estimated gaze direction are adjusted specifically for the driver based on a generated bias, said auto-calibration comprising:

monitoring an inner ocular distance corresponding to a distance between a center of each eyeball of the driver;

determining a proportion of the head of the driver based on the monitored inner ocular distance;

calibrating the camera device to estimate a distance from the camera device to the driver;

calculating a displacement of a gaze of the driver from the camera device based on the estimated distance;

determining a height of the driver based on the displacement of gaze; and generating the bias to adjust the estimated head pose and the estimated gaze direction of the driver based on the determined height and proportion of the head of the driver.

14. Apparatus for estimating gaze direction of a driver of a vehicle, comprising:

an in-vehicle monocular camera device for capturing image data in a field of view directed toward a face of the driver;

a detection and tracking module for extracting facial feature points of the driver from the image data captured by the camera device and detecting and tracking a location for each of an iris and first and second eye corners of an eyeball of the driver based on the extracted facial feature points, wherein the detection and tracking module detects the location of each of the iris and first and second eye corners using a Support Vector Machine classifier and tracks the respective locations in consecutive image frames utilizing a Kanada-Lucas-Tomas method of tracking;

a head pose estimation module utilizing the extracted facial feature points to estimate a head pose of the driver; and a gaze direction estimation module for estimating the gaze direction of the driver in a geometric model based on the estimated head pose and the detected and tracked location for each of the iris and the first and second eye corners.

15. The apparatus of claim 14, wherein the detection and tracking module extracts the facial feature points from the face of the driver utilizing an Active Appearance Model (AAM), the face detected utilizing an Open Source Computer Vision face detector.

16. The apparatus of claim 14, wherein the head pose estimation module utilizes Supervised Local Subspace Learning to build local linear models from a sparse and non-uniformly spaced sampled training set to estimate the head pose of the driver.

17. The apparatus of claim 14, further comprising:

an infrared illuminator for illuminating an interior of the vehicle during low-light conditions.

\* \* \* \* \*